(12) United States Patent
Rothenbuhler

(10) Patent No.: US 10,315,825 B2
(45) Date of Patent: Jun. 11, 2019

(54) RECLOSABLE PACKAGING

(71) Applicant: Amcor Flexibles Burgdorf GmbH, Burgdorf (CH)

(72) Inventor: Martin Rothenbuhler, Langnau I.E. (CH)

(73) Assignee: Amcor Flexibles Burgdorf GmbH, Burgdorf (CH)

( * ) Notice: Subject to any disclaimer, the term of this patent is extended or adjusted under 35 U.S.C. 154(b) by 0 days.

(21) Appl. No.: 15/544,981

(22) PCT Filed: Dec. 20, 2016

(86) PCT No.: PCT/EP2016/081971
§ 371 (c)(1),
(2) Date: Jul. 20, 2017

(87) PCT Pub. No.: WO2017/068203
PCT Pub. Date: Apr. 27, 2017

(65) Prior Publication Data
US 2018/0305103 A1 Oct. 25, 2018

(30) Foreign Application Priority Data
Jan. 14, 2016 (EP) .................... 16151346

(51) Int. Cl.
*B65D 75/58* (2006.01)
*B65D 77/20* (2006.01)
(Continued)

(52) U.S. Cl.
CPC ........... *B65D 77/2096* (2013.01); *B32B 3/26* (2013.01); *B32B 7/06* (2013.01); *B32B 7/12* (2013.01);
(Continued)

(58) Field of Classification Search
CPC ............ B65D 77/2096; B65D 75/5833; B65D 75/5838; B65D 2575/586; B32B 7/06;
(Continued)

(56) References Cited

U.S. PATENT DOCUMENTS

2010/0278454 A1 11/2010 Huffer

FOREIGN PATENT DOCUMENTS

| EP | 0193130 | | 9/1986 |
|---|---|---|---|
| EP | 0957045 | A1 | 11/1999 |

(Continued)

*Primary Examiner* — Michael C Miggins
(74) *Attorney, Agent, or Firm* — Reinhart Borner Van Deuren P.C.

(57) ABSTRACT

The present invention is related to a reclosable packaging container comprising a flexible laminate with a build-in opening and reclose feature, said laminate comprising an inner structure and an outer structure, adhesively joined face-to-face by a permanent adhesive, a pattern of pressure-sensitive adhesive being integrated between said inner and outer structures, the pressure-sensitive adhesive being entirely covered by the permanent adhesive, the outer structure forming the outer surface of the container and the inner structure forming the inner surface of the container, the outer structure comprising an outer flap portion delimited by a scoring linethrough the outer structure, and an inner structure comprising an inner flap portion delimited by a scoring line through the inner structure, the inner score line (6) and the outer score line creating an opening into the container when the flap portions are peeled back, a marginal region of the outer flap portion extending beyond an edge of the inner flap portion and overlying an underlying surface of the inner structure, the inner and outer flap portions being joined with the permanent adhesive and the pressure-sensitive adhesive being disposed between the marginal region of the outer flap portion and the underlying surface of the inner structure for attaching and re-attaching, in use, the outer flap portion to (Continued)

the underlying surface, wherein the sum of the layer thickness of the permanent adhesive and the pressure sensitive adhesion within the pattern is higher than the layer thickness of the permanent adhesive outside the pattern.

27 Claims, 8 Drawing Sheets

(51) Int. Cl.
*B32B 7/06* (2019.01)
*B32B 7/12* (2006.01)
*B32B 15/08* (2006.01)
*B32B 15/082* (2006.01)
*B32B 15/085* (2006.01)
*B32B 15/088* (2006.01)
*B32B 15/09* (2006.01)
*B32B 15/12* (2006.01)
*B32B 15/20* (2006.01)
*B32B 27/08* (2006.01)
*B32B 27/10* (2006.01)
*B32B 27/16* (2006.01)
*B32B 27/30* (2006.01)
*B32B 27/32* (2006.01)
*B32B 27/34* (2006.01)
*B32B 27/36* (2006.01)
*B32B 3/26* (2006.01)

(52) U.S. Cl.
CPC ............ *B32B 15/08* (2013.01); *B32B 15/082* (2013.01); *B32B 15/085* (2013.01); *B32B 15/088* (2013.01); *B32B 15/09* (2013.01); *B32B 15/12* (2013.01); *B32B 15/20* (2013.01); *B32B 27/08* (2013.01); *B32B 27/10* (2013.01); *B32B 27/16* (2013.01); *B32B 27/302* (2013.01); *B32B 27/306* (2013.01); *B32B 27/32* (2013.01); *B32B 27/34* (2013.01); *B32B 27/36* (2013.01); *B65D 75/5833* (2013.01); *B65D 75/5838* (2013.01); *B32B 2255/10* (2013.01); *B32B 2255/20* (2013.01); *B32B 2255/205* (2013.01); *B32B 2255/26* (2013.01); *B32B 2307/31* (2013.01); *B32B 2307/412* (2013.01); *B32B 2307/514* (2013.01); *B32B 2307/7242* (2013.01); *B32B 2307/748* (2013.01); *B32B 2307/75* (2013.01); *B32B 2439/40* (2013.01); *B32B 2439/46* (2013.01); *B65D 2575/586* (2013.01)

(58) Field of Classification Search
CPC ......... B32B 7/12; B32B 15/08; B32B 15/082; B32B 15/085; B32B 15/088; B32B 15/09; B32B 15/12; B32B 15/20; B32B 27/08; B32B 27/10; B32B 27/16; B32B 27/302; B32B 27/306; B32B 27/32; B32B 27/34; B32B 27/36; B32B 3/26; B32B 2255/10; B32B 2255/20; B32B 2255/205; B32B 2255/26; B32B 2307/31; B32B 2307/412; B32B 2307/514; B32B 2307/7242; B32B 2307/748; B32B 2307/75; B32B 2439/40; B32B 2439/46

See application file for complete search history.

(56) References Cited

FOREIGN PATENT DOCUMENTS

| EP | 1449789 A1 | 8/2004 |
| EP | 2243716 A1 | 10/2010 |
| EP | 2347972 A1 | 7/2011 |
| EP | 2257479 B1 | 1/2013 |
| EP | 2323921 B1 | 4/2013 |
| WO | WO 98/22367 A1 | 5/1998 |
| WO | WO 2005/123535 A1 | 12/2005 |
| WO | WO 2008/062159 A1 | 5/2008 |
| WO | WO 2008/115693 A1 | 9/2008 |
| WO | WO 2010/080810 A1 | 7/2010 |
| WO | WO 2011/032064 A1 | 3/2011 |
| WO | WO 2010/069575 A1 | 7/2011 |
| WO | WO 2011/110272 A1 | 9/2011 |
| WO | WO 2015/139941 A1 | 9/2015 |

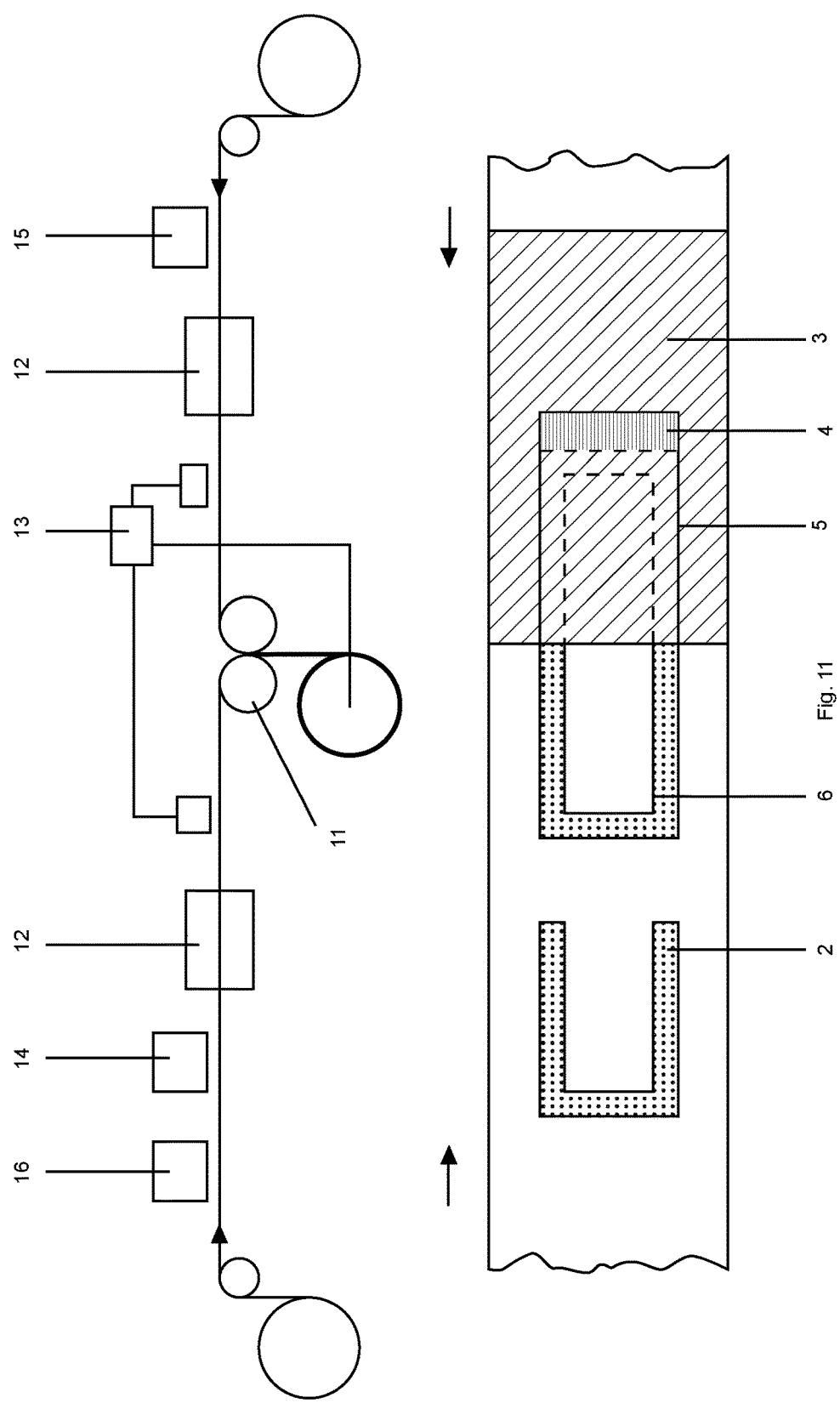

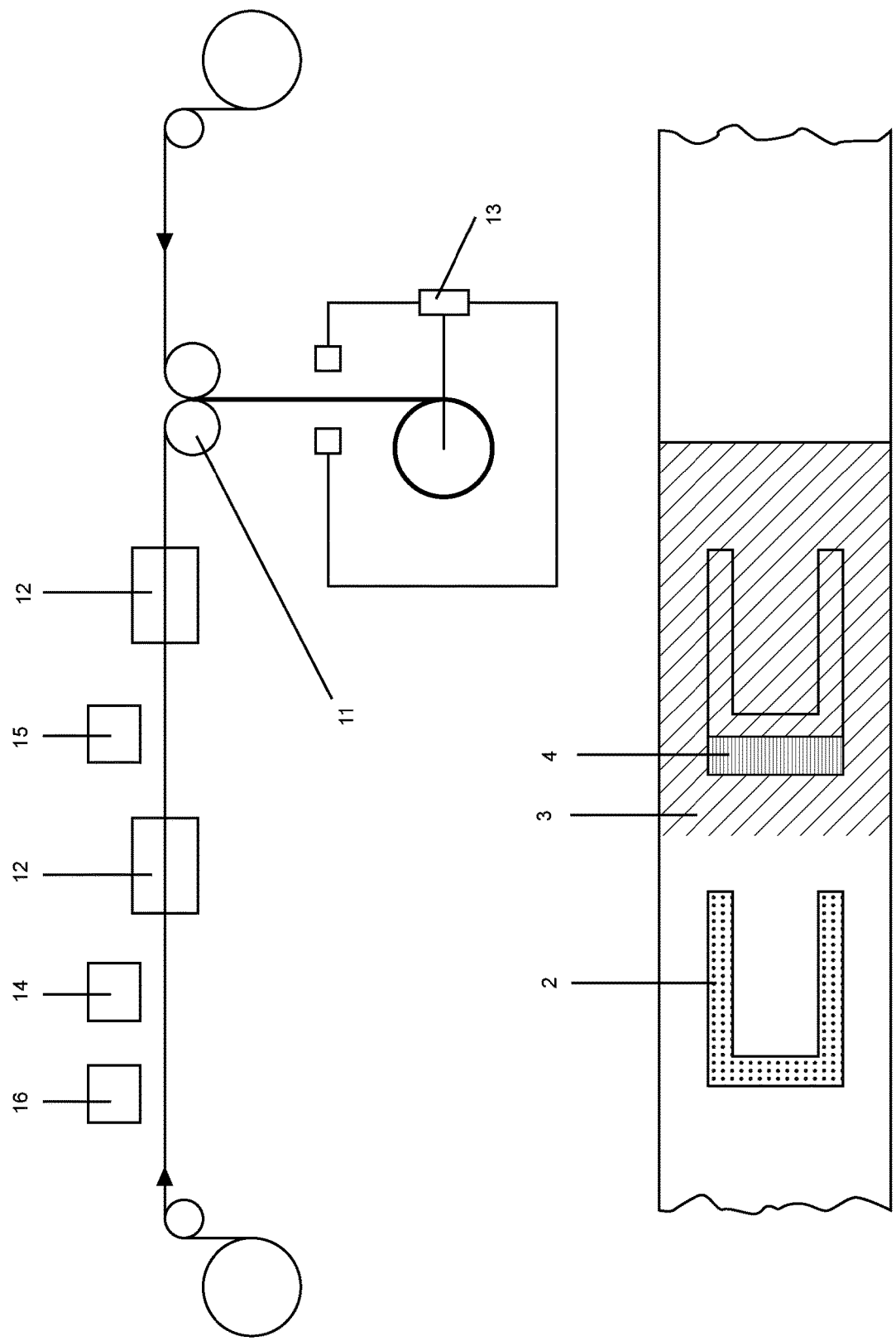

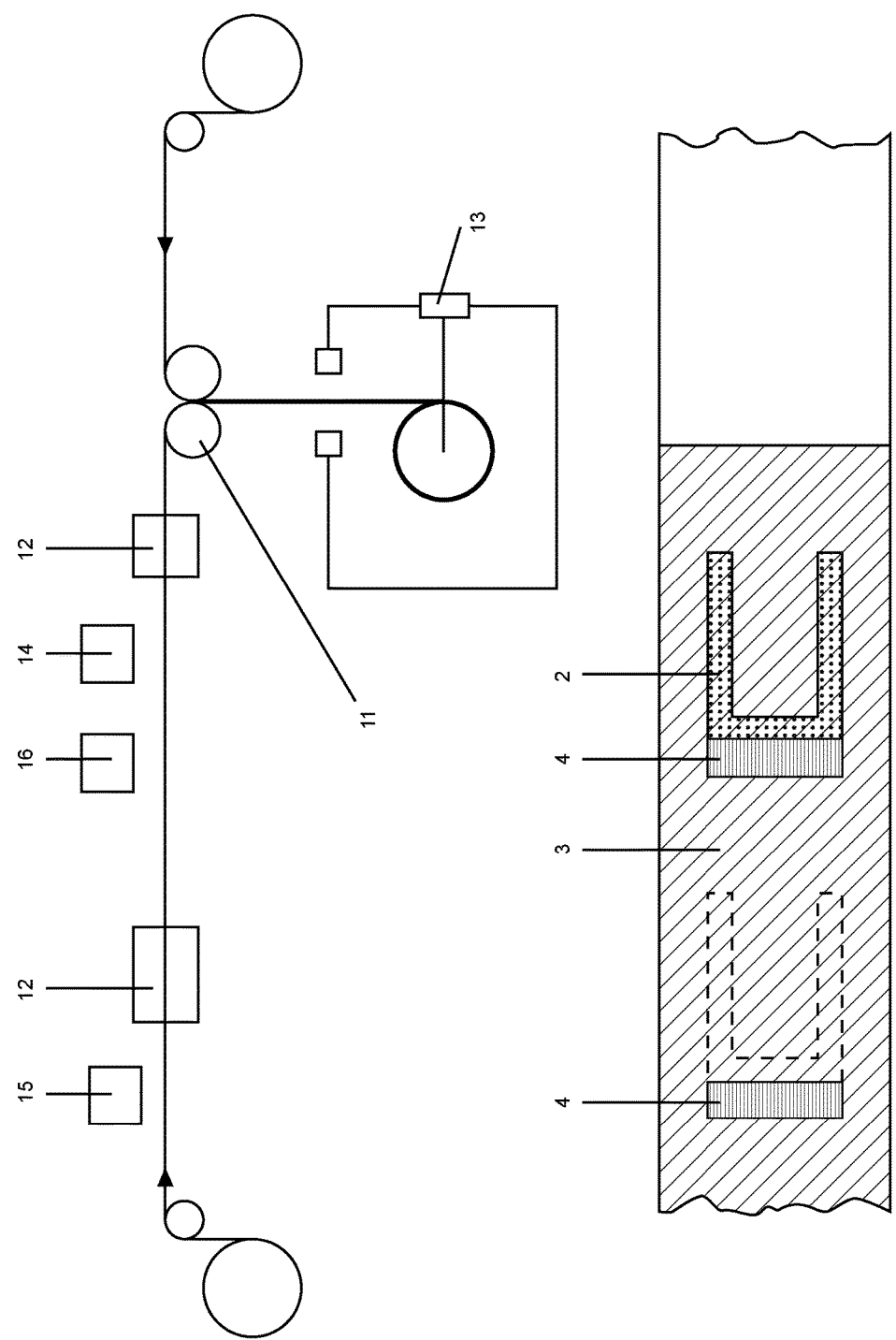

RECLOSABLE PACKAGING

FIELD OF THE INVENTION

The present invention is related to reclosable packaging containers comprising a flexible laminate with a build-in opening and reclose arrangement, and to a method for the production of this flexible laminate.

STATE OF THE ART

Flexible packaging materials are used in many applications and obtained by various form fill and seal technologies using laminates of specific constitutions, generally tailor-made for their specific applications.

Flexible laminates are well known in the flexible packaging industry. The laminates are usually obtained by adhesive laminations of one or more polymer films comprising lacquers, barrier layer and metallisation layer, etc. with other possible layers such as paper, metal foils, and the like. The polymer layer may be extruded, coextruded and/or joined by permanent adhesive (PA) and/or pressure-sensitive adhesive (PSA), to the final laminate.

Flexible packages often contain products that may be used progressively over a longer period of time. If the package is not reclosable, the products are susceptible to premature aging because they are exposed to the moisture of the surrounding environment. It is therefore important to be able to correctly reclose a package after its initial opening to keep the product that remains in the package fresh.

Various build-in opening and reclose arrangements have been developed for flexible packaging containers in the last decades.

The build-in opening and reclose systems of the prior art are obtained by specific score lines performed on both sides of the flexible laminate and delimiting adhesive pattern configurations. Each of those configurations has its specific advantages and drawbacks.

Nakamura discloses in EP 0 193 130 (1986) one of the first build-in opening and reclose structures in a laminate.

Alusuisse discloses in EP-A1-0 957 045 (1999) a packaging with a build-in opening and reclose flap obtained by a laminate comprising pattern-applied permanent and pressure-sensitive adhesives in register. The laminate comprises an outer structure and an inner structure. The outer structure comprises a barrier layer. The pressure-sensitive adhesive can be positioned on the inner or outer structure. The permanent and the pressure-sensitive adhesives are both applied on the same inner or outer structure and the score lines are performed separately on the inner structure and on the outer structure of the laminate.

Alcan discloses in EP-A1-1449 789 (2004) a packaging with a build-in opening and reclose flap obtained by a laminate comprising an outer structure and an inner structure. In a first embodiment, the laminate comprises pattern-applied permanent and pressure-sensitive adhesives in register, and in a second embodiment a permanent adhesive is applied on the entire surface on the first structure of the laminate and a pattern-applied pressure-sensitive adhesive on the second structure of laminate. In this case, the permanent adhesive and the pressure-sensitive adhesives are superimposed where the PSA is pattern applied and creates a detrimental local increase of thickness entailing a deformation of the produced reel of the laminate. The disclosed outer and inner structures may comprise a series of layers, among them a barrier layer. The pressure-sensitive adhesive can be positioned on the inner or on the outer structure. The permanent adhesive and the pressure-sensitive adhesive are both applied separately on the first and second structures of the laminate. The score lines are performed separately on the inner and outer structures before the structures are joined face to face and form the laminate.

Sonoco discloses in WO 2005/123535 A1 (2005) a packaging with a build-in opening and reclose flap obtained by a laminate comprising pattern-applied permanent and pressure-sensitive adhesives in register. The permanent adhesive does not recover the pressure-sensitive adhesive. The laminate comprises an outer structure and an inner structure, the inner structure comprises a seal layer and a barrier layer, in particular a metallized polymer layer that is able to reflect a laser beam possibly used to perform the score lines. The pressure-sensitive adhesive remains positioned on the flap after a first opening. The permanent adhesive and the pressure-sensitive adhesives are both applied in register on the same first or second structure of the laminate and the score lines are performed on the finished laminate after joining of the inner and outer structures of the laminate.

Sonoco, in a divisional application EP-A1-2 243 716 of WO 2005/123535 A1, claims the replacement of the permanent adhesive by a pressure-sensitive adhesive, wherein the first and second structures of the laminate are joined by a pressure sensitive adhesive layer without the use of any permanent adhesive.

Wrigley in WO 2008/115693 A1 (2008) discloses a method for making a flexible build-in opening and reclose feature in a laminate comprising pattern-applied permanent adhesive and a strip of pressure-sensitive adhesive in register in the marginal region between the score lines. The laminate comprises a first structure and a second structure. The first structure is independently scored before joining the second structure and forming a laminate. The second score line is then performed on the laminate.

Printpack Illinois discloses in WO 2010/080810 A1 (2010) a reclosable container with build-in opening and reclose feature based on the inner and outer sides of a laminate with a resealable cover portion and a pressure-sensitive adhesive affixing the inner side to the outer side. Here, the basic difference compared to the mentioned prior art before 2010 is that the permanent adhesive is replaced by a heat seal.

Avery Dennison in WO 2011/032064 A1 (2011) discloses a resealable packaging laminate with a build-in opening and reclose arrangement comprising an outer and an inner laminate portion. The outer and inner score lines being arranged to define a marginal region comprising a pressure-sensitive adhesive at least partly in contact with a release layer positioned on the inner layer.

Hochland in EP-A1-2 347 972 (2011) discloses a reclosable packaging, in particular a lid for a tray, with a build-in opening and reclose arrangement comprising a rupturable weakening line in the lid. The lid is obtained by a laminate comprising permanent adhesive in the central area of the lid and pressure-sensitive adhesive in the border area of the lid. The outer structure comprises among other possible layers a barrier layer.

Other laminates, specifically related to cigarette-pack inner or outer wrapper comprising similar build-in opening and reclose arrangements are disclosed by BAT in WO 98/22367 and WO 2008/062159 or by Focke in WO 2011/069575 and WO 2011/110272.

Sonoco in EP-A1-2 257 479 (2010) discloses a flexible packaging laminate having built-in opening/reclose and tamper-evidence features by forming the laminate from an outer structure joined in face-to-face relation to an inner structure. Score lines are formed in both structures to enable an opening to be formed through the laminate by lifting a flap out of the plane of the laminate. The score line through the outer structure defines a larger opening than the score line through the inner structure, such that a marginal region of the outer structure extends beyond the edge of the opening portion of the inner structure. A pressure-sensitive adhesive is used to re-adhere the marginal region to an underlying surface of the inner structure adjacent the opening through the laminate. The outer score line includes at least one tear portion that is torn through upon initial opening, thus indicating the package has been at least partially opened.

Avery Dennison in EP-A1-2 323 921 (2011) discloses a resealable container having an easily accessed yet airtight seal via the use of a tamper evident rupture strip which provides the container or package with improved shelf life for the product contained therein.

Amcor in WO 2015/139941 A1 (2015) discloses a reclosable packaging container comprising a flexible laminate with a build-in opening and reclose feature in the form of a flap, said laminate comprising an inner structure and an outer structure adhesively joined face-to-face by a permanent adhesive, a pattern of pressure-sensitive adhesive being integrated between said inner structure and said outer structure, the pressure-sensitive adhesive being entirely covered by the permanent adhesive, a marginal region delineated by inner and outer score lines comprises the pressure-sensitive adhesive overlaying the permanent adhesive in an imprint region of reduced permanent adhesive thickness, the cumulative thicknesses of the pressure-sensitive adhesive and of the permanent adhesive in the imprint region being substantially the same as the thickness of the permanent adhesive outside this region.

None of the prior art documents uses a pattern of pressure sensitive adhesive, entirely covered by permanent adhesive, wherein the sum of the thickness of pressure sensitive adhesive and permanent adhesive is substantially higher than the thickness of permanent adhesive outside said pattern.

AIM OF THE INVENTION

The present invention aims to provide an alternative to the existing packages with build-in opening and reclose feature and a method for the production of the laminate presenting specific advantages over the above-mentioned prior art.

SUMMARY OF THE INVENTION

The present invention discloses a reclosable packaging container comprising a flexible laminate with a build-in opening and reclose feature, said laminate comprising an inner structure and an outer structure, adhesively joined face-to-face by a permanent adhesive, a pattern of pressure-sensitive adhesive being integrated between said inner and outer structures in the region of the build-in opening and reclose feature, the pressure-sensitive adhesive being entirely covered by the permanent adhesive, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined with the permanent adhesive and the pressure-sensitive adhesive being disposed between the marginal region of the outer flap portion and the underlying surface of the inner structure for attaching and re-attaching, in use, the outer flap portion to the underlying surface, the laminate being characterized in that the ratio of the sum of the thicknesses of the superposed permanent adhesive and the pressure sensitive adhesive in the pattern to the thickness of the permanent adhesive outside the pattern is at least 1.3, preferably at least 2.0, more preferably at least 2.5, most preferably at least 3.0.

Preferred embodiments of the laminate for the reclosable packaging container as in the present invention disclose at least one or a combination of the following features:
- the thicknesses of the permanent adhesive outside the pattern is comprised between 0.5 and 10 μm, preferably between 1.0 and 7.0 μm, more preferably between 1.5 and 5.0 μm;
- the pattern is characterized in that the thickness of the permanent adhesive is comprised between:
  - 0.5 and 10 μm when the thickness of the pressure sensitive adhesive is comprised between 2 and 10 μm;
  - preferably between 1.0 and 7.0 μm when the thickness of the pressure sensitive adhesive is comprised between 2.5 and 7.0 μm;
  - more preferably between 1.5 and 5.0 μm when the thickness of the pressure sensitive adhesive is comprised between 3.0 and 5.0 μm;
- the thickness of the permanent adhesive in the pattern is lower than the thickness of the permanent adhesive outside the pattern, the lower thickness of the permanent adhesive in the pattern forming a recess for the pressure sensitive adhesive;
- the ratio of the thickness of the pressure-sensitive adhesive to the thickness of the permanent adhesive in the pattern is comprised between 1 and 9, preferably between 1 and 7, more preferably between 1 and 4;
- the thickness of the permanent adhesive outside the pattern is comprised between 1.5 and 3.5 μm when the thickness of the pressure sensitive adhesive in the pattern is comprised between 2.5 and 6 μm;
- the permanent adhesive comprises one or more (co) polymers selected from the group consisting of polyurethane, acrylic, alkylene vinyl alkanate and alkylene allyl alkanate;
- the pressure sensitive adhesive comprises one or more one or more (co)polymers selected from the group consisting of acrylic, alkylene vinyl alkanate and alkylene allyl alkanate acrylic;
- the pressure sensitive adhesive is a water-based adhesive characterized by a solid content comprised between 25 and 80% by weight, preferably between 30 and 75% by weight, more preferably between 35 and 70% by weight;
- the permanent adhesive comprises one or more crosslinking agents selected from the group consisting of non-blocked polyisocyanate, blocked polyisocyanate, C1-C4 alkoxylated amino formaldehyde and carbodiimide;
- one of the inner or outer structures of the laminate additionally comprises a pattern of release coating in an opening-initiation zone adjacent to the pressure-sensitive adhesive pattern, said release coating being entirely covered by the permanent adhesive;

the inner structure includes a layer of sealable material, said sealable material being a sealable polymer or a sealable coating;

the inner structure and/or the outer structure include(s) a barrier layer;

the flexible laminate with a build-in opening and reclose feature is a lid.

The present invention further discloses a method for making the flexible laminate for the packaging container of the present invention, said laminate having a built-in opening and reclose feature, said method comprising the steps of:

pattern-applying a pressure sensitive adhesive onto one surface of the inner or outer structure;

applying a permanent adhesive onto at least 85% of the entire surface of the inner or outer structure, the permanent adhesive entirely covering the pressure sensitive adhesive before or after adhesively joining the inner structure to the outer structure;

scoring the inner and outer structures by a scoring station before or after adhesively joining the inner structure to the outer structure face to face via the permanent adhesive to form the laminate, an outer score line being formed through the thickness of the outer structure in registration with the outer perimeter of the pressure sensitive adhesive, and an inner score line being formed through the thickness of the inner structure in registration with the inner perimeter of the pressure sensitive adhesive, the marginal region of the outer opening portion between the outer and inner score lines being attached to an underlying surface of the inner structure via the pressure sensitive adhesive.

A preferred embodiment of the method for making the flexible laminate of the packaging container as in the present invention discloses applying the layer of permanent adhesive with recesses in the pattern region, the pressure sensitive adhesive being pattern applied in a separate step on said recesses.

BRIEF DESCRIPTION OF THE DRAWINGS

FIG. 11 represents a side view of a first lamination arrangement and a top view of the laminate obtained thereby.

FIG. 12 represents a side view of a second lamination arrangement and a top view of the laminate obtained thereby.

FIG. 13 represents a side view of a third lamination arrangement and a top view of the laminate obtained thereby.

KEY

Figure 1:
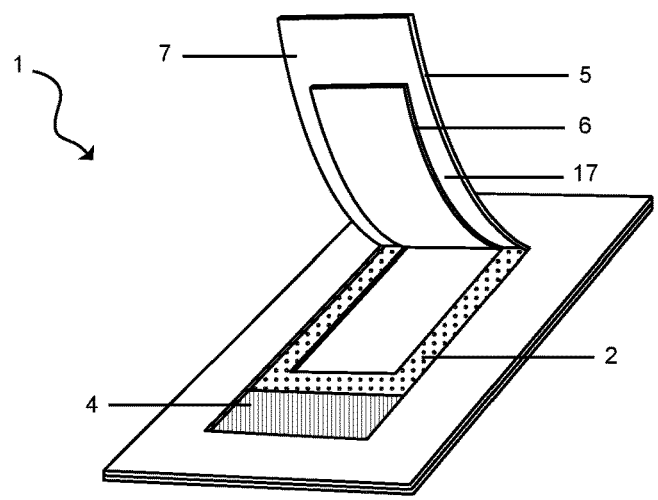
FIG. 1 is a view of the build-in opening and reclose feature with a pressure sensitive adhesive region surrounding the opening and an optional release-coating layer region remaining on the inner structure of the laminate after opening.
Figure 2:
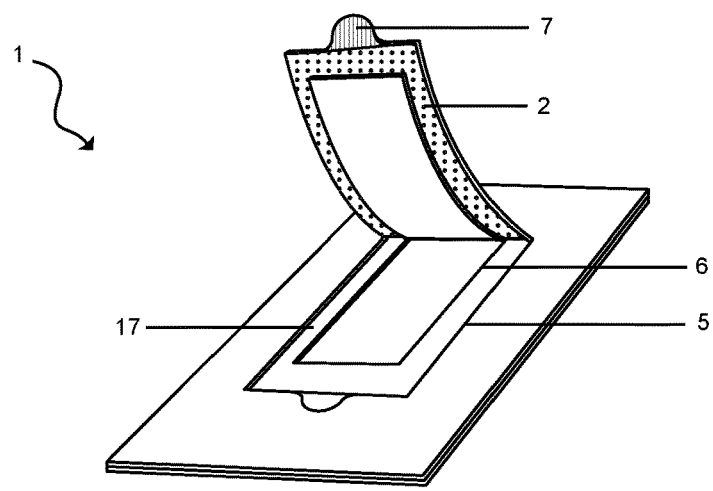
FIG. 2 is a view of the build-in opening and reclose feature with a pressure sensitive adhesive region and an optional release-coating region on the opening initiation (grasping portion), both remaining on the outer structure (flap) of the laminate after opening.
Figure 3:
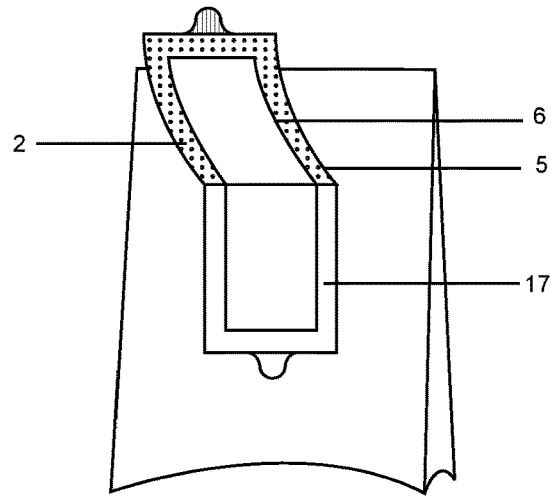
FIG. 3 is a view of a standing pouch comprising a build-in opening and reclose feature as in the invention, where the pressure sensitive adhesive and an optional release-coating layer, positioned on the opening initiation, remains on the outer structure after opening.
Figure 4:
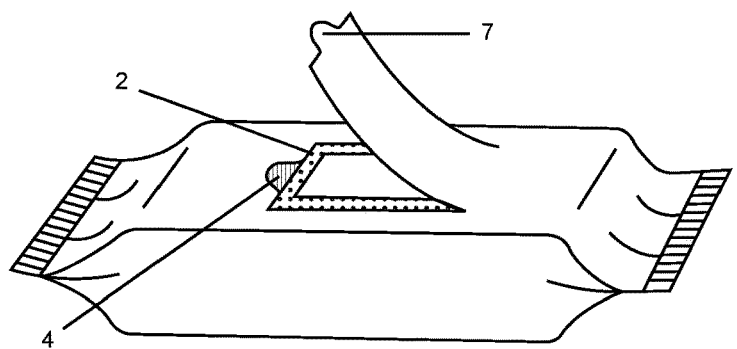
FIG. 4 is a view of a flow pack comprising a build-in opening and reclose feature as in the invention, where the pressure sensitive adhesive and the optional release-coating layer on the opening initiation remains on the inner structure after opening.

1. Build-in opening and reclose feature
2. Pattern-applied pressure-sensitive adhesive (PSA)
3. Permanent adhesive (PA)
4. Release-coating layer or permanent adhesive free region for the opening initiation
5. Scoring line of the outer structure
6. Scoring line of the inner structure
7. Opening initiation (dead zone)
8. Outer structure of the laminate
9. Inner structure of the laminate
10. Barrier layer
11. Lamination station
12. Oven
13. Scoring station (laser, kiss cutting . . . ) with eye mark/scoring coordination
14. PSA applicator
15. PA applicator
16. Release layer applicator (optional)
17. Marginal region

DESCRIPTION OF THE INVENTION

The present invention discloses a flexible packaging container formed by a laminate having a built-in opening and reclose feature 1, the laminate comprising a two-part structure, namely an outer structure 8 joined in face-to-face relation with an inner structure 9. The adjectives "inner" and "outer" are related to the position in the packaging container, the inner structure 9 being in contact with the content of the packaging container and the outer structure 8 being in contact with the environment. Inner and outer structures can also be named first and second structures of the laminate.

At least one of both structures (8, 9) comprises a pattern-applied pressure-sensitive adhesive (PSA) 2 and/or a permanent adhesive (PA) 3 on an important part of the entire surface. Once both structures (8, 9) are joined by lamination, the patterned PSA is entirely covered by the PA.

The region covered by both adhesives is characterized by a total adhesive layer thickness of 20 μm or less, preferably 17 μm or less, more preferably 14 μm or less and most preferably 11 μm or less, wherein the ratio of the layer thickness of the PSA over the layer thickness of the PA is comprised between 1 and 9, preferably between 1 and 7 more preferably between 1 and 4 and wherein the sum of the thicknesses of the PA and PSA in the pattern to the PA thickness outside the pattern is at least 1.3, preferably at least 2.0, more preferably at least 2.5 and most preferably at least 3.0.

The pattern region further is characterized in that the thickness of the PA 3 is comprised between:
  0.5 and 10 μm when the thickness of the PSA is comprised between 2 and 10;
  preferably between 1.0 and 7.0 μm when the thickness of the PSA is comprised between 2.5 and 7.0 μm;
  more preferably between 1.5 and 5.0 μm when the thickness of the PSA is comprised between 3.0 and 5.0 μm.

The inventors have observed that for a PSA thickness lower than 2 μm, an efficient reclosing of the reclosable opening feature is difficult.

The combined adhesive thickness in the pattern being higher than the PA thickness outside the pattern results in an embossment of the laminate at the side of the inner structure 9 and of the outer structure 8.

Once the laminate being wound to form a roll, said embossments create an extra pressure on the PSA pattern. It has been observed that a few days ageing of the laminates in rolls improves the pressure sensitive adhesive properties. The inventors have surprisingly found that the extra pressure, resulting from the embossments, has a positive effect on the PSA efficiency.

Moreover the inventors have observed an easier opening and a more efficient reclosing of the reclosable opening feature, for a combined adhesive thickness in the pattern being higher than the PA thickness outside the pattern.

The inner and outer structures (8,9) of the laminate include usual lamination structures. The outer structure generally exhibits a printable polymer layer, sometimes associated to a paper layer. Reverse printing is often preferred. Barrier layer 10 such as oriented polyamide (OPA) or EVOH, aluminium foils and the like are usual constituents. The inner structure 9 often comprises a polyolefin seal layer, sometimes associated to support layer, among them oriented polymers like OPP, OPA, OPET, . . . . Substantially all combinations are possible and well known by those skilled in the art.

The number of constituents of a laminate are mainly governed by their specific function in the laminate, by lamination facilities and by price considerations. Technically, almost all combinations are possible.

A score line, defined here as a line of weakness or a trough cut, is formed in the outer structure (outer score line 5) to define an outer opening portion and an inner line of weakness or a trough cut is formed in the inner structure (inner score line 6) to define an inner opening portion. The outer and inner opening portions are attached to each other by a PA, except in the marginal region 17 that extends beyond the peripheral edge of the inner opening portion between the outer and inner cut or weakening lines, where a PSA pattern is applied and superposed on the permanent adhesive 3.

The permanent adhesive 3 covers at least 85%, preferably at least 90%, more preferably at least 95% of the entire surface of one of the outer or inner structures (8,9). The remaining part of the surface, being PA-free, is patterned and may serve as opening initiation. For the particular case where the PA covers about 100% of the entire surface of the inner or outer structure, a release coating pattern 4, for the opening initiation, is pattern-applied. In the present invention it is preferred to use a patterned PA-free region as opening initiation.

The PSA pattern 2 is entirely covered by PA layer 3; independently on
  whether the PSA is first pattern applied on the inner or the outer structure, followed by the application of PA over at least 85% of the entire surface of the inner or outer structure, or
  whether the PA is first applied over at least 85% of the entire surface of the inner or the outer structure followed by the patterned application of the PSA,
the PSA patterns will be entirely covered by the PA layer, while the PA layer will be patterned covered by PSA before or after joining to form the laminate.

As far as the outer and inner opening portions are connected by a PA, they can be lifted out of the plane of the build-in opening as a flap, thereby creating an opening through the packaging structure defined by the inner line of weakness (see FIGS. 1 to 6).

After a first opening, the flap created by the connection of the inner and outer portions can be reclosed by adhering the marginal region 17 of the outer opening portion to the underlying portion of the inner structure 9 via the PSA. This PSA can be positioned on the outer or the inner structure (8,9), both positions having their advantages and drawbacks. Positioned on the inner structure 9, the PSA is often rapidly contaminated by the content of the package, such as confectionary articles or biscuits, etc. Positioned on the outer structure 8, the PSA is possibly passivized by finger contact. The choice of the position of the PSA is therefore conditioned by the content of the packaging and the requirements of the end-user.

The manufacturing processes of the present invention are shown in FIGS. 11, 12 and 13.

In one embodiment of the invention depicted in FIG. 11, the PSA and optionally the release-coating layer 4 covering the opening initiation 7, are pattern applied onto the inner structure 9 of the laminate, and the PA is applied onto the outer structure 8 over at least 85% of the entire surface, such that the PA covers the pattern-applied PSA and the optional release-coating layer 4 once the first and second structures (8,9) are adhesively joined to form the laminate.

In another embodiment of the invention depicted in FIG. 12, the PSA and optionally the release-coating layer 4 covering the opening initiation 7, are first pattern applied onto one surface of the outer or inner structure (8,9) of the laminate. The PA is then applied over at least 85% of the entire surface of the same structure such that the PA covers the pattern-applied PSA and the optional release-coating layer 4, before the first and second structures are adhesively joined to form the laminate.

In an additional embodiment depicted in FIG. 13, the PA is first applied onto at least 85% of the entire surface of the outer or inner structure (8,9) of the laminate, the PSA and an optional release-coating layer 4 covering the opening initiation 7 are then pattern applied onto the PA on the same structure of the laminate before the first and second structures are adhesively joined to form the laminate.

In each of the above embodiments the PA layer has a thickness which is substantially the same everywhere and may comprise an recess region wherein the thickness of PA is reduced, said recess region corresponding to the pattern for PSA and optional release coating 4 application.

The outer and inner structures (8,9) are preferably supplied from rolls and have substantially the same width. Once laminated face to face, both structures form a laminate that is a continuous web to be supplied to the final packaging station.

Figure 14A:
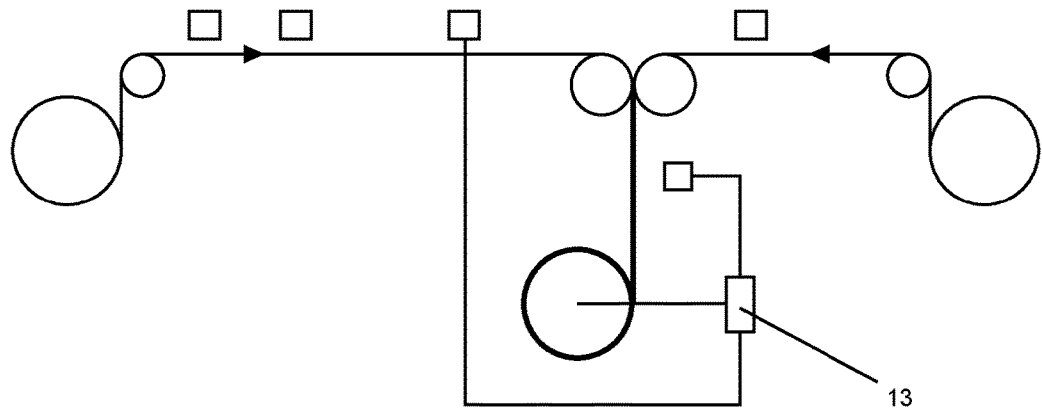
FIGS. 14a) and 14b) show a schematic view of two additional embodiments for the production of the laminate of the packaging container of the present invention, wherein two additional positions of scoring stations are disclosed.
Figure 14B:
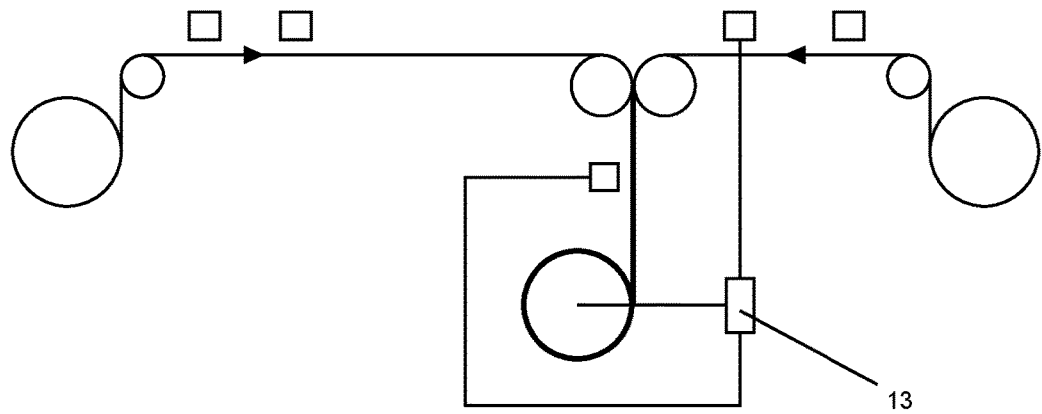

One or both of the inner and outer structures (8, 9) or the adhesively assembled laminate are then scored at a scoring station 13 where an outer score line 5 is formed through the thickness of the outer structure 8 in registration with the outer perimeter of the pattern-applied PSA and possibly release-coating layer 4 if an opening initiation 7 is present, and an inner score line 6 is formed through the thickness of the inner structure 9 in registration with the inner perimeter of the PSA layer 2. The score lines (5, 6) can be formed by laser scoring, die cutting or kiss cutting, or any other available method well-known in the art. Various scoring positions are disclosed in FIGS. 11, 12 and 14. The position of the scoring station, in case of laser scoring, is principally conditioned by the presence or not of a barrier layer that is able to stop or to reflect the laser beam.

To maintain the outer and inner score lines (5, 6) in registration around the PSA and the optional release layer 4 pattern (outer and inner perimeters of both), the scoring operation is synchronized with the advancement of the laminate by means of an optical sensor detecting an eye mark sequence on the laminate, whose location in relation to the PSA and optional release-coating layer 4 pattern is known.

In case of laser cutting, the depth and width of the score line can be adjusted by regulating the power output of the beam and the residence time of a given spot on the film surface. These parameters are selected in combination with the material to be scored. Some materials are more receptive than others to laser energy—see for instance U.S. Pat. Nos. 3,909,582 and 5,158,499 giving extensive information on laser-cutting technology.

Furthermore, various combinations of mechanical and laser scoring are possible. One possibility is for instance to laser-score one side of the laminate and to mechanically cut the other side if one of both structures is not laser-scorable, for instance in the case of a non-absorbing seal layer, such as polyethylene without reflective barrier layer behind.

The adhesives can be applied using any suitable equipment and technique known in the art such as gravure roll for instance.

In the final laminate, the outer opening portion bonded by the PA to the inner opening portion is peelable from the underlying surface of the inner structure 9 allowing both portions to be peeled back and to create a reclosable opening. The marginal region 21 formed between the outer and inner score lines (5, 6) on the outer opening portion, is re-attachable to an underlying surface of the inner structure 9 by the PSA.

The inner structure 9 of the laminate comprises one or more of a sealant or support layer(s) (17, 18) forming the inner surface of the laminate. Sealant layers are well known in the art and comprise heat-seal material such as heat-seal lacquer, LDPE, HDPE, EVA, polypropylene, polyolefin copolymers in general, ionomers or cold-seal materials.

The inner and outer structures (8, 9) can also comprise one or more barrier layer(s) 10 known in the art such as metallized polyolefin films, for instance metallized oriented polypropylene (oPP), ethylene vinyl alcohol copolymer (EVOH), oriented polyamide (oPA). Other possibilities are ceramic-coated films like AlOx or SiOx-coated polymer films, aluminium foil and prelaminates comprising aluminium foil and one or more polymer films.

A combination of barrier coatings, such as a ceramic coating and a polyvinyl alcohol coating preferably may be used for providing barrier properties to laminates preferably transparent laminates.

The multilayer structure comprises one or more of the following layers:
  oriented polypropylene (oPP, 6-40 μm);
  high-density polyethylene (HDPE, 15 to 150 μm);
  polystyrene (PS, 15-40 μm);
  oriented polyamide (oPA, 8-40 μm);
  polyester such as polyethylene terephthalate (PET, 6 to 50 μm);
  paper;
  Aluminium;
  Seal layer (LDPE. Copo ethylene-propylene . . . ).

All the layers of the inside or outside structures (8, 9) can be laminated by means of adhesives or coextruded with possible tie layer if necessary. The methods for all possible combinations are known in the art.

In the lamination process, the outer structure 8 is provided from a supply roll to a print station for printing graphics and/or indicia on it (not shown). This can be achieved by means of a rotogravure printer. In an embodiment of the invention, the inks are applied on the outer surface of the outer structure 8. In another embodiment of the invention, the outer structure 8 includes a transparent layer such as a PET layer that is reverse-printed, which means that the inks are applied to the surface of the transparent layer, which is subsequently laminated to another structure, the inks are visible through the first structure by transparency. An additional embodiment comprises a combination of printing on the outer surface of the outer structure and reverse printing.

The surface of the outer structure 8 can be treated by corona discharge or flame treatment just prior to printing in the print station or even in an earlier production step. The corona treatment is typically used in the art to render the surface more receptive to the inks and/or to increase the affinity of the surface to the PSA and to the optional release-coating layer 4 that is subsequently pattern-applied to the surface (see FIG. 11). The higher affinity to the PSA and the optional release layer coating 4 in case of the presence of an opening initiation 7 is automatically obtained when the PSA/optional release layer is directly pattern applied on the PA such as shown in FIG. 13. This is a particular advantage of this embodiment.

After the optional corona and printing operation, the inner and outer structures (8,9) are submitted to application stations of PA, PSA and optional release coating 4 in various orders depending on the chosen embodiments.

Figure 10:
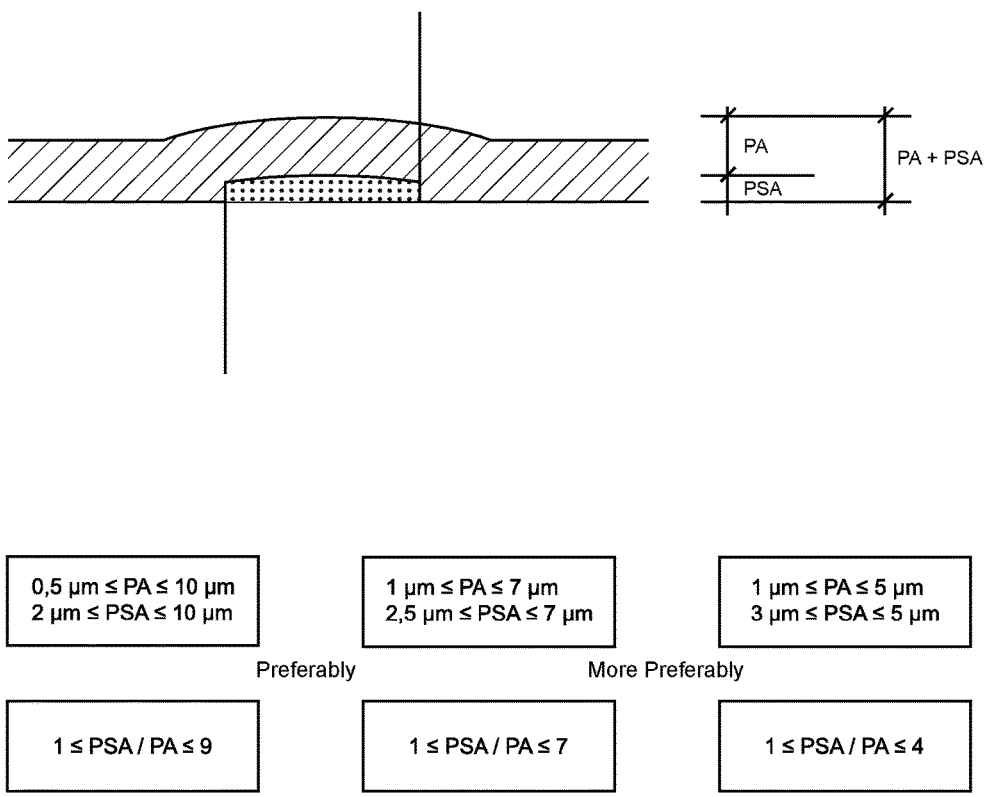
FIG. 10 represents a detailed view of the adhesive layer in the pattern region disclosing the respective thickness ranges of PA and PSA and their ratios.

The embodiment described in FIG. 10 first applies an optional release pattern and then a PSA pattern on the inner structure 9. At the same time the PA is applied on at least 85% of the entire surface of the outer surface 8.

The embodiment described in FIG. 12 first applies an optional release coating 4 pattern and then a PSA pattern on the inner structure 9 followed by PA application on at least 85% of the same inner structure.

The embodiment described in FIG. 13 first applies PA on at least 85% of the entire surface of the inner structure 9. An optional release-coating pattern 4 and a PSA are then applied to the same inner structure 9 on top of the PA creating a limited extra-thickness on this location.

In the present invention, independently of the embodiment, one side of the PSA patterned layer is always in contact with one side of the inner 9 or outer 8 structure, while the other side of the patterned PSA layer always is in contact with the PA, said other side of the PSA layer being completely covered by PA. On the one hand PA is from one side of its layer, in contact with the outer structure 8 and with the other side of its layer with the inner structure 9 except for the PSA and optional release coating patterns. On the other hand PA is from one side of its layer, in contact with the inner structure 9 and with the other side of its layer with the outer structure 8 except for the PSA and optional release coating patterns.

The PA layer may have a substantially uniform layer thickness over at least 85% of entire surface of the inner 9 or outer 8 structure, but preferably comprises a recess region wherein the thickness of PA is reduced, said recess region corresponding to the pattern for PSA and optional release coating 4. Combining PA and PSA in the recess region results in a patterned region, wherein total adhesive thickness (sum of PA thickness and PSA thickness exceeds the thickness of the PA layer outside that region and wherein the ratio of the sum of the thicknesses of PA and PSA to the PA thickness outside the patterned region is at least 1.3, preferably at least 2.0, more preferably at least 2.5 and most preferably at least 3.0.

All possible applying combinations can of course be contemplated for the PA, PSA and the optional release-coating layer 4. Instead of applying the release-coating layer 4 and PSA pattern on the inner structure 9, they could be applied to the outer structure 8 and the PA on the inner structure 9. All of them could also be applied to the outer structure 8. The chosen option is irrelevant as long as no substantial extra thickness is created by the overlapping of the PA layer and the PSA/optional release layer. A too big extra thickness would lead to an undesirable bump or mark on the reel of laminate.

The adhesives for being used in the present invention are solvent based, water-based or high solids.

The solvent based adhesive comprises between 20 and 60% by weight, preferably between 25 and 55% by weight of one or more polymer(s) and others adhesive components such as fillers and tackifiers among others.

The water-based adhesive in general is an aqueous dispersion, substantially free of organic solvents and comprising from 20 to 80% by weight, preferably from 25 to 75% by weight, more preferably from 30 to 70% by weight of one or more polymer(s) and other adhesive components such as fillers and tackifiers among others.

The high solid adhesive in general comprises less than 20% by weight, preferably less than 15% by weight, more preferably less than 10% by weight, most preferably less than 5% by weight or even less than 1% by weight of organic solvent. The high solid adhesive is substantially organic solvent-free.

The one or more polymer(s) of the adhesives of the present invention preferably are selected from the group consisting of (co)polymers composed of a carbon backbone and/or polyurethane copolymers.

The PSA is characterized by a bond/peel strength which is lower than the bond/peel strength of the PA, the difference between both being at least 0.5 N/15 mm measured according to ASTM F904-1998 (reapproved 2008).

ASTM F904—Standard Test Method for Comparison of Bond Strength or Ply Adhesion of Similar Laminates Made from Flexible Materials—wherein separated plies of a test specimen are placed into the grips of a tensile testing machine and wherein the grips then are separated. The force required to 76.2 mm of the test specimen is defined as the bond strength.

For example, the bond/peel strength of the permanently tacky PSA towards, a metallised surface of an oriented polypropylene film, should be lower than 1.3 N/15 mm, preferably lower than 1.1 N/15 mm, more preferably lower than 0.9 N/15 mm, whereas the bond/peel strength of the PA towards a metallised surface of an oriented polypropylene film should be higher than 1.50 N/15 mm, preferably higher than 1.6 N/15 mm, more preferably higher than 1.8 N/15 mm and can be as high as 3.0 N/15 mm. Other surfaces could provide higher or lower levels of bond/peel strength, yet the bond/peel strength of the PA always should be higher than the bond/peel strength of the PSA, the difference between both being at least 0.5 N/15 mm.

PSA form viscoelastic bonds that are permanently tacky and adhere under simple finger pressure, whereas PA has no permanent tackiness.

The bond/peel strength of the adhesive is obtained from the adhesive composition as such, i.e. from the different components as originally present in the adhesive formulation preferably after evaporation of water and/or organic solvents, or is determined by the components of the adhesive composition and the degree of their further conversion, preferably after application. Furthermore the bond/peel strength will depend on the type of bonded substrates.

Said further conversion preferably is accomplished by subjecting the adhesive formulation to heat and/or actinic irradiation preferably after evaporation of water and/or organic solvents.

The (co)polymers composed of a carbon backbone preferably are obtained from the polymerization of one or more ethylenically unsaturated monomer(s) selected from the group consisting of C1-C20-alkyl (meth)acrylates, vinyl and allyl esters of carboxylic acids of up to 20 carbon atoms, vinyl ethers of C1-C8 alcohols, vinyl aromatics of up to 20 carbon atoms, ethylenically unsaturated nitriles, vinyl halides, C1-C10-hydroxyalkyl(meth)acrylates, C1-C10-acetoacetoxyalkyl(meth)acrylates, (meth)acrylamide, (meth)acrylamide substituted on the nitrogen by C1-C4-alkyl, ethylenically unsaturated carboxylic acids, ethylenically unsaturated dicarboxylic acids, half-esters of ethylenically unsaturated dicarboxylic acids, anhydrides of ethylenically unsaturated dicarboxylic acids, non-aromatic hydrocarbons having at least two conjugated double bonds, C1-C8 alkenes and mixtures of these monomers.

Said (co)polymers preferably comprise from 60 to 100% by weight of one or more monomers selected from the group consisting of C1-C20-alkyl (meth)acrylates and vinyl and allyl esters of carboxylic acids of up to 20 carbon atoms.

The one or more polymers further comprise from 0 to 40% by weight of one or more monomers selected from the group consisting of vinyl ethers of C1-C8 alcohols, vinyl aromatics of up to 20 carbon atoms, ethylenically unsaturated nitriles, vinyl halides C1-C10-hydroxyalkyl(meth)acrylates, C1-C10-acetoacetoxyalkyl(meth)acrylates, (meth)acrylamide, (meth)acrylamide substituted on the nitrogen thereof by C1-C4-alkyl, ethylenically unsaturated carboxylic acids, ethylenically unsaturated dicarboxylic acids, half-esters of ethylenically unsaturated dicarboxylic acids, anhydrides of ethylenically unsaturated dicarboxylic acids, non-aromatic hydrocarbons having at least two conjugated double bonds, C1-C8 alkenes and mixtures of these monomers.

The adhesives comprising (co)polymers comprising reactive groups, such as hydroxyl-, carboxyl-, and/or acetoacetoxy functional groups can further be converted after application through reaction of the polymers' functional groups with one or more crosslinking agents.

Preferred crosslinking agents are polyisocyanate, carbodiimide or lower alkoxylated amino formaldehyde crosslinking agents.

Crosslinking agents may be added in an amount of up to 35% by weight, preferably preferably of up to 30% by weight, more preferably of up to 25% by weight of the total weight of the one or more polymer(s) comprising one or more reactive sites and crosslinking agents.

The polyurethane copolymers preferably are obtained from the reaction of one or more polyols, and optionally one or more chain extenders, with one or more organic polyisocyanate(s).

Examples of polyols are polyester polyols, polyester-amide polyols, polyamide polyols, polyether polyols, polyurethane polyols, silicon comprising polyols and rubber polyols having a number average molecular weight comprised between 500 and 15,000 g/mole, preferably between 1000 and 10,000 g/mole, more preferably between 2,000 and 8,000 g/mole.

Examples of chain extenders are low molecular weight polyols such as ethylene glycol, 1,4-butanediol, 1,6-hexandiol and trimethylolpropane, and low molecular weight diamines such as ethylene diamine hexamethylene diamine, isophorone diamine and triethylene tetramine.

Examples of polyisocyanates are: aliphatic diisocyanates such as hexamethylene diisocyanate; alicyclic diisocyanates such as 1,4-cyclohexane diisocyanate; aromatic diisocyanates such as 2,4- or 2,6-tolylene diisocyanate; aromatic aliphatic diisocyanates such as 1,3- or 1,4-bis(1-isocyanate-1-methylethyl)benzene; organic triisocyanate such as triphenylmethane-4,4',4''-triisocyanate; organic tetraisocyanate such as 4,4'-diphenyldimethylmethane-2,2'-5,5'-tetraisocyanate; dimers or trimers derived from the above polyisocyanates.

The polyurethane (co)polymers may comprise terminal hydroxyl or isocyanate groups.

The hydroxyl-functional polyurethane (co)polymers may contribute to the adhesive properties without any further conversion, but preferably are further reacted with one or more polyisocyanates.

The isocyanate-functional polyurethane (co)polymers preferably are further converted through reaction with one or more nucleophiles, such as a polyol, an urea or water.

The molecular weight of the (co)polymers, as present in the original adhesive formulation and their subsequent optional further conversion as well as the degree of said conversion, in order to get the adequate final bond/peel strength, in general is dependent on whether a solvent based, water based or high solid adhesive is concerned.

The value of the bond/peel strength after application and optional conversion determines whether it is a permanent adhesive or a pressure sensitive adhesive.

For the particular case of water-based adhesives the (co)polymers are made water dispersible by the incorporation of anionic, cationic, nonionic moieties or a combination thereof into their backbone. Preferably the moieties are anionic or non-ionic.

The adhesive formulations comprising (co)polymers having reactable groups in general are further converted from a 2-component system where the reactive groups and the crosslinker are mixed preferably just before application, or from a 1-component system comprising a storage stable mixture comprising one or more (co)polymers having reactable groups and one or more crosslinker.

In general the polyurethane comprising adhesives are obtained from reaction of one or more polyols with one or more polyisocyanates either in a 2-component system where the polyols and polyisocyanates are mixed preferably just before application, or in a 1-component system comprising a storage stable mixture comprising one or more polyols and one or more of the above isocyanates or from one or more polyurethane copoplymers, as such without any further conversion.

The polyisocyanate crosslinker for being used in both, the one- and the two-component adhesive systems adhesives preferably are blocked.

A solvent-free adhesive in general is obtained from the conversion of a reactive fluid adhesive precursor, for example through thermal activation and/or actinic radiation.

The reactive adhesive precursor preferably is blend of one or more (co)polymer(s) composed of a carbon backbone and/or polyurethane copolymer(s), one or more coreactable monomers and one or more crosslinkers, selected and mixed in such a way that a workable adhesive formulation is obtained.

The (co)polymers or the reactive adhesive precursors and coreactable monomers for being used in the water- or solvent-based or high solid adhesive formulations of the present invention, also may be functionalised by ethylenically unsaturated groups or cyclic ether groups for being further converted, preferably under the influence of actinic irradiation, through radical and cationic initiation respectively. The selection of suitable photoinitiators and optional photoactivators, dependent of the irradiation source and the mechanism of initiation, is obvious for the one skilled in the art of radiation curing.

In addition to the (co)polymers, the adhesive composition further may comprise one or more fillers and one or more tackifiers. Examples of fillers are finely milled or precipitated chalks, dolomite, quartz powder and silica flour.

The composition may furthermore contain wetting agents or dispersants, for example for the fillers thickeners and further conventional additives, such as antifoams and preservatives.

To the adhesive formulation, in particular PA further may comprise one or more adhesion promotors. Preferred adhesion promotors are preferred copolymers are ethylene-acrylic acid copolymers and ethylene vinylacetate copolymers or sylanic polymers The adhesive and release-coating layer 4 applying stations (14,15,16) are complemented by drying means such as ovens or infra-red heater for instance, allowing the applied adhesives to be in good condition for the next manufacture step (lamination or additional application of adhesives or release-coating layer).

The packaging container of the invention comprising the laminates with a build-in open and reclose feature made as in the invention provides a tamper-evidence function because it is very difficult to replace the opening portions after initial opening exactly on the same place as before the opening. When the outer layer of the outer structure 8 is printed, in particular if it is reverse printed, it is almost impossible to achieve perfect registration of the printed matter across the score line when reclosing the package.

Figure 5:
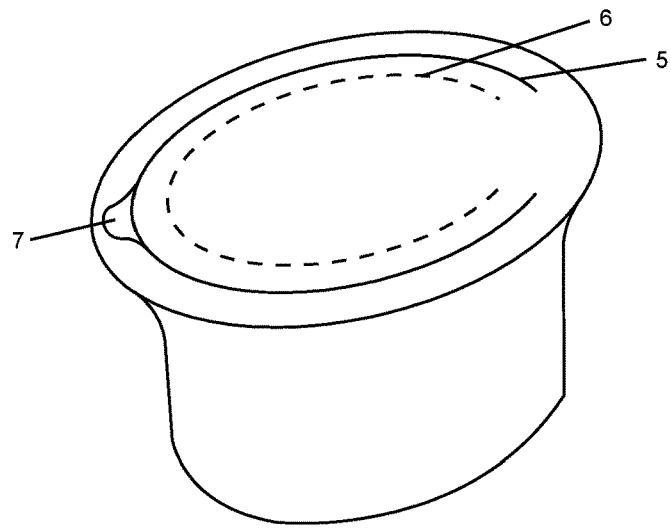
FIGS. 5 and 6 show a tray comprising a build-in opening and reclose arrangement as in the invention on its lid. The pressure sensitive adhesive and the optional release-coating layer of the opening initiation remain on the outer structure after opening.
Figure 6:
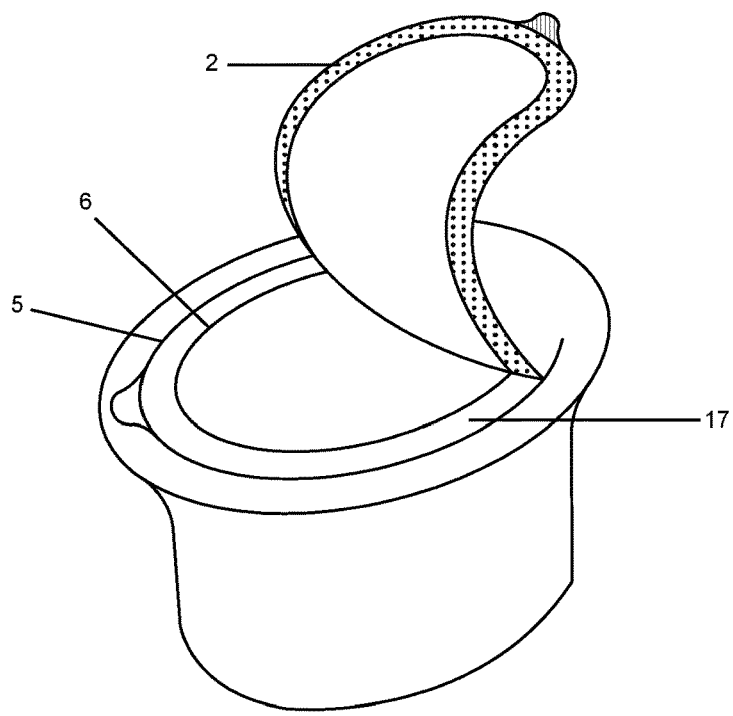
Figure 7:
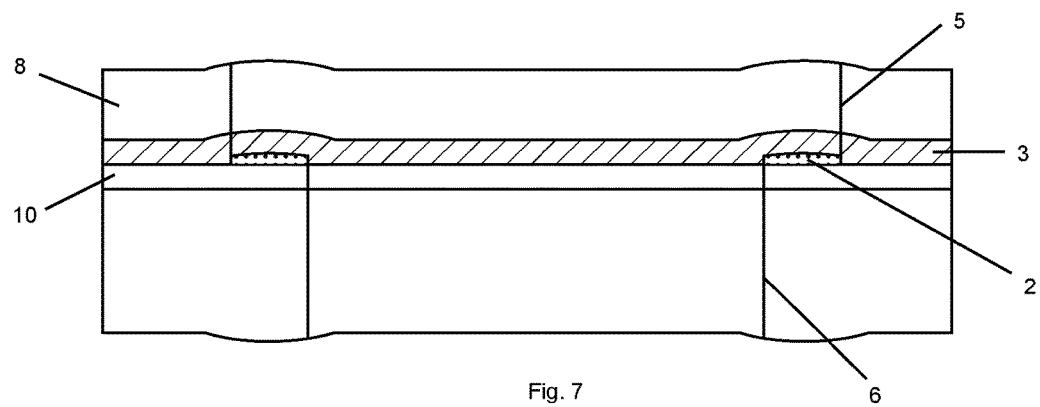
FIG. 7 represents a section of the laminate wherein the pressure sensitive adhesive, pattern applied on the inner structure is entirely covered with a permanent adhesive with uniform layer thickness.
Figure 8:
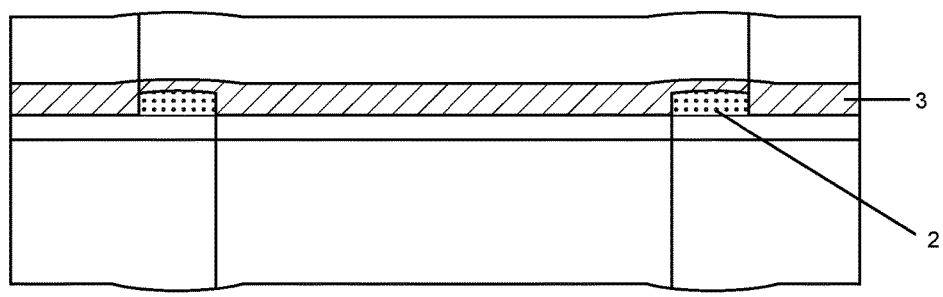
FIG. 8 represents a section of the laminate wherein the pressure sensitive adhesive, pattern applied on the inner structure is entirely covered with a permanent adhesive said permanent adhesive having a lower thickness (recesses) in the pattern region for the emplacement of the pressure sensitive adhesive.
Figure 9:
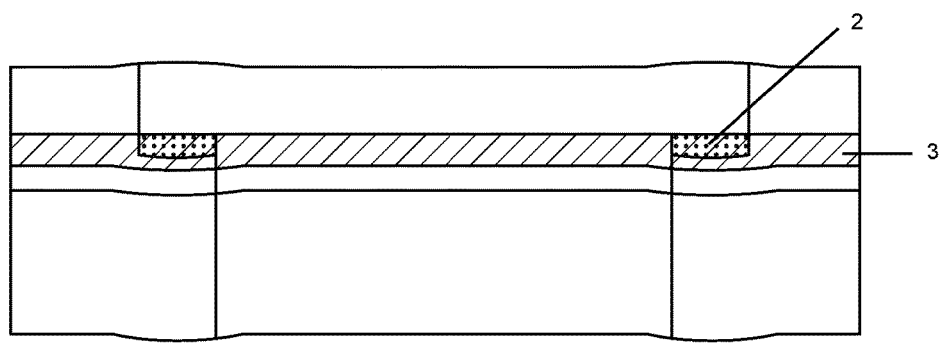
FIG. 9 represents a section of the laminate wherein the pressure sensitive adhesive, pattern applied on the outer structure is entirely covered with a permanent adhesive said permanent adhesive comprising also recesses for the pressure sensitive pattern.

The packages as in the invention not only encompass flow packs or pouches (FIGS. 3 and 4) but also lidding for tray or other container (FIGS. 5 and 6). In this manner, the lid includes a built-in reclosable opening. Enveloped pack, cigarette packs . . . .

The following illustrative examples are merely meant to exemplify the present invention but are not destined to limit or otherwise define the scope of the present invention.

Duplex Structure

Example 1 Corresponds to the Embodiment as Shown in FIG. 11

A solvent based 2-component polyurethane permanent adhesive (Loctite Liofol LA3644/LA6055 from Henkel) was applied over the entire surface of a polyethylene terephthalate film of 23 µm.

In the same working step, a water based pressure sensitive acrylic adhesive (Acronal V215 from BASF) was pattern applied on a metallized oriented polypropylene film of 35 µm (QCM from Treofan)

After flashing off the solvent and water in an infrared oven, the polyethylene terephthalate film of 23 µm comprising the permanent adhesive layer with a thickness of 1.5 µm and the metallized polypropylene film of 35 µm comprising the pressure sensitive adhesive patterns with a thickness of 4.4 µm were then adhesive laminated to create a duplex structure.

Example 2 Corresponds to the Embodiment as Shown in FIG. 12

Example 1 was reproduced with the difference that the water based pressure sensitive acrylic adhesive first is pattern applied on the metallized oriented polypropylene film of 35 µm and a bigger solvent based 2-component polyurethane adhesive was applied over the entire surface of the metallized polypropylene film of 35 µm comprising the patterned pressure sensitive adhesive. After flashing of the solvent, a polyethylene terephthalate film of 23 µm and the metallized oriented polypropylene film of 35 µm, comprising the pattern applied pressure sensitive adhesive, with a thickness of 4.4 µm, completely covered by permanent adhesive with a layer thickness of 4.2 µm, were adhesive laminated to create a duplex structure.

Example 3 Corresponds to the Embodiment as Shown in FIG. 13

Example 1 was reproduced with the difference that the water based pressure sensitive acrylic adhesive was patterned applied on top of the permanent adhesive layer obtained from applying the solvent based 2-component polyurethane adhesive, over the entire surface of polyethylene terephthalate film of 23 µm.

After flashing of the solvent, the polyethylene terephthalate film of 23 µm, having the permanent adhesive over its entire surface, said permanent adhesive, with a layer thickness of 2.5 µm, being patterned covered by pressure sensitive adhesive with a thickness of 4.4 µm, was adhesive laminated to a metallized oriented polypropylene film of 35 µm, to create a duplex structure.

Example 4

Example 3 was repeated wherein the permanent adhesive was a water based acrylic adhesive (Loctite Liofol LA-29-208 from Henkel) with a layer thickness of 3.2 µm and wherein the pressure sensitive adhesive was acrylic based (Acronal DS 3609 X from BASF) with a layer thickness of 5.1 µm, both after flashing-off water.

Example 5

Example 2 was repeated wherein the permanent adhesive was a water based 2-component acrylic adhesive (Loctite Liofol LA-29-208/LA 5804 from Henkel) at a film thickness of 3.2 µm after flashing off water.

Example 6 Corresponds to the Embodiment as Shown in FIG. 13

Example 1 was reproduced with the difference that the water based pressure sensitive acrylic adhesive was patterned applied on top of the permanent adhesive layer obtained from applying the solvent based 2-component polyurethane adhesive, over the substantially entire surface of polyethylene terephthalate film of 23 µm.

After flashing of the solvent, the polyethylene terephthalate film of 23 µm, having the permanent adhesive over its entire surface, said permanent adhesive, with a layer thickness of 2.5 µm outside the pattern and 1.5 µm at the pattern, being patterned covered by pressure sensitive adhesive with a thickness of 3.8 µm, was adhesive laminated to a metallized oriented polypropylene film of 35 µm, to create a duplex structure.

Quality Evaluation

In the following examples the thicknesses have been adapted within the working mode and the polymer film thicknesses of example 6 to evaluate the quality of the build-in opening and reclose feature versus the thickness distribution and ratios of the PSA and PA. The films used for all the examples:

The quality evaluation is based on the peel open strength and adhesive strength after reclosing the flap. The behaving of reclosing and reopening on the measured areas after the peel & bond strength for 5 cycles indicates the whether the quality evaluation is:

++=very good properties for reclosing and reopen
+=good properties for reclosing and reopen
−/+ neutral properties for reclosing and reopen
−=negative properties for reclosing and reopen
−−=very negative properties for reclosing and reopen

| Example | Thickness PA outside pattern (µm) | Thickness PA in pattern (µm) | Thickness PSA in pattern (µm) | Quality evaluation + remark |
| --- | --- | --- | --- | --- |
| 7 | 1 | 1 | 3 | + (PA<) |
| 8 | 1 | 1 | 5 | ++ (PSA>> compensate PA<) |
| 9 | 6 | 3 | 5 | ++ (with recess) |
| 10 | 3 | 1 | 4 | ++ (with recess) |
| 11 | 8 | 8 | 1 | −(PSA<<) |
| 12 | 3 | 2 | 1.5 | − (with recess, PSA<<) |
| 13 | 1 | 1 | 2 | −/+ |
| 14 | 2 | 1 | 4 | ++ (with recess) |
| 15 | 1.5 | 1 | 1.5 | − (with recess, PSA<<) |
| 16 | 2.5 | 2 | 4.5 | ++ (with recess) |

Laser Perforation (ROFIN-BAASEL Lasertech Equipment)

The laser perforation of the duplex structure can performed according to numerous embodiments, dependent on the available laser equipment.

Preferred embodiments are:
cut inline on both sides of the duplex laminate structure;
separately cut inline the first and second structure before both structures are adhesive laminated to a duplex structure;
cut inline one of both structures before the adhesive lamination of both structures followed by the adhesive lamination step and then by the cut of the second structure;
cut inline one of both structures before the adhesive lamination of both structures followed by the cut off-line of the second structure after lamination;
cut inline one of both structures after adhesive lamination of both structures followed by the cut off-line of the second structure;
cut off-line on both sides of the duplex laminate structure.

After laser cut of the duplex structure to create the build-in opening and reclose feature for the reclosable packaging of the present invention, the duplex structure is cut into the right width and wound on rolls.

Bond/Peel Strength

The build-in opening and reclose feature of the duplex structures of example 1 to 5, after laser perforation, shows first opening force values between 1.0 and 1.5N/15 mm according to ASTM F904:98R08 (former DIN 53357), wherein the separation was between the pressure sensitive adhesive and the metallized oriented polypropylene film for examples 1 to 4 and wherein the separation was between the pressure sensitive adhesive and the permanent adhesive for example 5.

The invention claimed is:

1. A reclosable packaging container comprising a flexible laminate with a build-in opening and reclose feature, said laminate comprising an inner structure and an outer structure, adhesively joined face-to-face by a permanent adhesive, a pattern of pressure-sensitive adhesive being integrated between said inner and outer structures in the region of the build-in opening and reclose feature, the pressure-sensitive adhesive being entirely covered by the permanent adhesive, the outer structure forming the outer surface of the container and the inner structure forming the inner surface of the container, the outer structure comprising an outer flap portion delimited by a scoring line through the outer structure, and an inner structure comprising an inner flap portion delimited by a scoring line through the inner structure, the inner score line and the outer score line creating an opening into the container when the flap portions are peeled back, a marginal region of the outer flap portion extending beyond an edge of the inner flap portion and overlying an underlying surface of the inner structure, the inner and outer flap portions being joined with the permanent adhesive and the pressure-sensitive adhesive being disposed between the marginal region of the outer flap portion and the underlying surface of the inner structure for attaching and re-attaching, in use, the outer flap portion to the underlying surface, the laminate being characterized in that the ratio of the sum of the thicknesses of the superposed permanent adhesive and the pressure sensitive adhesive in the pattern to the thickness of the permanent adhesive outside the pattern is at least 1.3.

2. The reclosable packaging container as in claim 1 wherein the thicknesses of the permanent adhesive outside the pattern is comprised between 0.5 and 10 μm.

3. The reclosable packaging container as in claim 1 wherein the pattern is characterized in that the thickness of the permanent adhesive is comprised between:
   0.5 and 10 μm with the thickness of the pressure sensitive adhesive is comprised between 2 and 10 μm.

4. The reclosable packaging container as in claim 1 wherein the thickness of the permanent adhesive in the pattern is lower than the thickness of the permanent adhesive outside the pattern, the lower thickness of the permanent adhesive in the pattern forming a recess for the pressure sensitive adhesive.

5. The reclosable packaging container as in claim 1 wherein the ratio of the thickness of the pressure-sensitive adhesive to the thickness of the permanent adhesive in the pattern is comprised between 1 and 9.

6. The reclosable packaging container as in claim 1 wherein the thickness of the permanent adhesive outside the pattern is comprised between 1.5 and 3.5 μm with the thickness of the pressure sensitive adhesive in the pattern is comprised between 2.5 and 6 μm.

7. The reclosable packaging container as in claim 1, wherein the permanent adhesive comprises one or more (co)polymers selected from the group consisting of polyurethane, acrylic, alkylene vinyl alkanate and alkylene allyl alkanate.

8. The reclosable packaging container as in claim 1, wherein the pressure sensitive adhesive comprises one or more one or more (co)polymers selected from the group consisting of acrylic, alkylene vinyl alkanate and alkylene allyl alkanate acrylic.

9. The reclosable packaging container as in claim 1, wherein the pressure sensitive adhesive is a water-based adhesive characterized by a solid content comprised between 25 and 80% by weight.

10. The reclosable packaging container as in claim 1, wherein the permanent adhesive comprises one or more crosslinking agents selected from the group consisting of non-blocked polyisocyanate, blocked polyisocyanate, C1-C4 alkoxylated amino formaldehyde and carbodiimide.

11. The reclosable packaging container as in claim 1, wherein one of the inner or outer structures of the laminate additionally comprises a pattern of release coating in an opening-initiation zone adjacent to the pressure-sensitive adhesive pattern, said release coating being entirely covered by the permanent adhesive.

12. The reclosable packaging container as in claim 1, wherein the inner structure includes a layer of sealable material, said sealable material being a sealable polymer or a sealable coating.

13. The reclosable packaging container as in claim 1, wherein the inner structure and/or the outer structure include(s) a barrier layer.

14. The reclosable packaging container as in claim 1, wherein the flexible laminate with a build-in opening and reclose feature is a lid.

15. The reclosable packaging container as in claim 1, wherein the ratio of the sum of the thicknesses of the superposed permanent adhesive and the pressure sensitive adhesive in the pattern to the thickness of the permanent adhesive outside the pattern is at least 2.0.

16. The reclosable packaging container as in claim 1, wherein the ratio of the sum of the thicknesses of the superposed permanent adhesive and the pressure sensitive adhesive in the pattern to the thickness of the permanent adhesive outside the pattern is at least 2.5.

17. The reclosable packaging container as in claim 1, wherein the ratio of the sum of the thicknesses of the superposed permanent adhesive and the pressure sensitive adhesive in the pattern to the thickness of the permanent adhesive outside the pattern is at least 3.0.

18. The reclosable packaging container as in claim 1 wherein the thicknesses of the permanent adhesive outside the pattern is comprised between 1.0 and 7.0 μm.

19. The reclosable packaging container as in claim 1 wherein the thicknesses of the permanent adhesive outside the pattern is comprised between 1.5 and 5.0 μm.

20. The reclosable packaging container as in claim 1 wherein the pattern is characterized in that the thickness of the permanent adhesive is comprised between:
   1.0 and 7.0 μm with the thickness of the pressure sensitive adhesive is comprised between 2.5 and 7.0 μm.

21. The reclosable packaging container as in claim 1 wherein the pattern is characterized in that the thickness of the permanent adhesive is comprised between:
   1.5 and 5.0 μm with the thickness of the pressure sensitive adhesive is comprised between 3.0 and 5.0 μm.

22. The reclosable packaging container as in claim 1 wherein the ratio of the thickness of the pressure-sensitive adhesive to the thickness of the permanent adhesive in the pattern is comprised between 1 and 7.

23. The reclosable packaging container as in claim 1 wherein the ratio of the thickness of the pressure-sensitive adhesive to the thickness of the permanent adhesive in the pattern is comprised between 1 and 4.

24. The reclosable packaging container as in claim 1, wherein the pressure sensitive adhesive is a water-based adhesive characterized by a solid content comprised between 30 and 75% by weight.

25. The reclosable packaging container as in claim 1, wherein the pressure sensitive adhesive is a water-based adhesive characterized by a solid content comprised between 35 and 70% by weight.

26. A method for making the flexible laminate of the packaging container of claim 1, said laminate having a built-in opening and reclose feature, said method comprising the steps of:

pattern-applying a pressure sensitive adhesive onto one surface of the inner or outer structure;

applying a permanent adhesive onto at least 85% of the entire surface of the inner or outer structure, the permanent adhesive entirely covering the pressure sensitive adhesive before or after adhesively joining the inner structure to the outer structure;

scoring the inner and outer structures by a scoring station before or after adhesively joining the inner structure to the outer structure face to face via the permanent adhesive to form the laminate, an outer score line being formed through the thickness of the outer structure in registration with the outer perimeter of the pressure sensitive adhesive, and an inner score line being formed through the thickness of the inner structure in registration with the inner perimeter of the pressure sensitive adhesive, the marginal region of the outer opening portion between the outer and inner score lines being attached to an underlying surface of the inner structure via the pressure sensitive adhesive.

27. The method according to claim 26 wherein the layer of permanent adhesive is applied with recesses in the pattern region, the pressure sensitive adhesive being pattern applied in a separate step on said recesses.

* * * * *